March 11, 1969 A. H. GOTTFRIED 3,432,765

CIRCUIT FOR THE REDUCTION OF NOISE BY CANCELLATION TECHNIQUES

Filed Nov. 1, 1967 Sheet 1 of 3

INVENTOR,
ARTHUR H. GOTTFRIED.
BY Gordon W. Kerr, Agent
Harry M. Saragovitz,
Edward J. Kelly, Herbert Berl
ATTORNEYS.

CIRCUIT FOR THE REDUCTION OF NOISE BY CANCELLATION TECHNIQUES

Filed Nov. 1, 1967

COMPONENTS OF $R_1'$

LOCUS OF $R_1'$

COMPONENTS OF $R_2$

LOCUS OF $R_2$

COMPONENTS OF $R_3'$

LOCUS OF $R_3'$

INVENTOR,
ARTHUR H. GOTTFRIED.
BY Gordon W. Kerr, Agent
Harry M. Saragovitz,
Edward J. Kelly, Herbert Berl
ATTORNEYS.

March 11, 1969 A. H. GOTTFRIED 3,432,765
CIRCUIT FOR THE REDUCTION OF NOISE BY CANCELLATION TECHNIQUES
Filed Nov. 1, 1967 Sheet 3 of 3

INVENTOR,
ARTHUR H. GOTTFRIED.
BY Gordon W. Kerr, Agent
Harry M. Saragovitz,
Edward J. Kelly, Herbert Berl
ATTORNEYS.

United States Patent Office 3,432,765

Patented Mar. 11, 1969

CIRCUIT FOR THE REDUCTION OF NOISE BY CANCELLATION TECHNIQUES 3,432,765

Arthur H. Gottfried, 5 Lakeside Ave., Rumson, N.J. 07760

Filed Nov. 1, 1967, Ser. No. 679,936
U.S. Cl. 330—126 6 Claims
Int. Cl. H03f 3/68

ABSTRACT OF THE DISCLOSURE

This cancellation technique involves the utilization of wideband noise in two signal-free channels equally spaced from and on opposite sides of a center channel containing a desired periodic signal to cancel the noise in the center channel. The noise signals in the two signal-free channels are heterodyned to the frequency of the center channel and automatically phased with each other and with the center channel noise. The center channel noise is then removed or greatly reduced by a simple cancellation or subtraction process.

Figure 1:
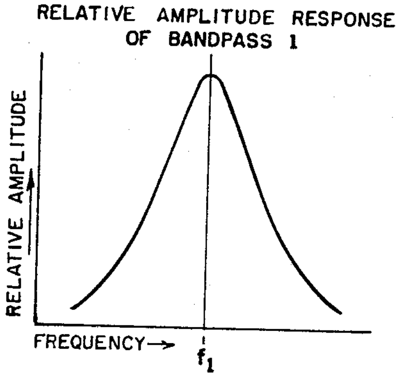

The invention described herein may be manufactured, used, and licensed by or for the Government for governmental purposes without the payment to me of any royalty thereon.

This invention relates to noise reduction, and more particularly to a technique for reducing wide-band noise in amplifiers or receivers. In order to reduce noise, it is necessary to recognize some distinguishing characteristics of the noise which will permit it to be separated from a desired intelligence modulated signal which may be immersed therein. Such distinguishing characteristics may be, for example, the large amplitude of certain impulse type noise relative to the desired signal; the wideband spectrum of noise compared to the relatively narrow bandwidth of intelligence signals and the repetitive or periodic nature of intelligence signals compared to the random nature of noise. The present invention takes advantage of the wide frequency range of noise to permit detection and amplification of narrow band radio frequency intelligence signals immersed in the noise of much greater magnitude. The concept and apparatus can be used to reduce any random or impulse noise of broad frequency band. Examples of random noise are thermal noise produced by current flow through a resistor or the shot noise of vacuum tubes. Impulse noise may result from atmospheric disturbances or electric arcing.

The broad concept of the present invention involves the utilization of the noise in two frequency bands equally spaced from and on opposite sides of a center channel containing a desired signal to cancel the noise in the center channel, leaving only the desired signal therein. The noise in all three channels must originate from a common source, for example from the input resistor of a wideband radio frequency amplifier common to all three channels, or from an atmospheric disturbance. The apparatus for implementing this concept involves a source of intelligence signals at a given frequency obscured by wideband noise. These signals are applied in parallel to three linear tuned amplifiers with center frequencies equally spaced from each other, to form the three channels referred to above. All three channels have identical gains, bandwidths and equal phase characteristics relative to their center frequencies. The upper and lower channels must be free of any intelligence or other periodic signals. The center channel contains the intelligence signal as well as noise. The apparatus further includes means to heterodyne the noise of the upper channel down in frequency to that of the center channel and to heterodyne the noise of the lower channel up in frequency to that of the center channel using a common local oscillator with a nominal frequency equal to the frequency difference between the center channel and either of the other channels. The local oscillator is automatically controlled in phase by the heterodyned noise signals derived from the upper and lower channels such that these heterodyned noise signals are brought into phase with each other and with the noise of the center channel. The center channel noise is then cancelled by subtraction or cancellation of the heterodyned noise therefrom, leaving only the desired signal in the center channel. The apparatus also includes means to apply impulse trains to all three channels for calibration purposes. Also included are variable time delay and attenuation means whereby the heterodyned noise signals may be equalized in timing and amplitude with the noise of the center channel, thus insuring maximum noise reduction.

It is thus an object of the invention to provide novel circuitry for the reduction of noise of various types.

A further object of the invention is to provide circuitry by means of which an intelligence signal may be detected even though it is initially obscured by noise.

Figure 11:
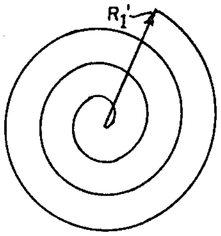
Figure 12:
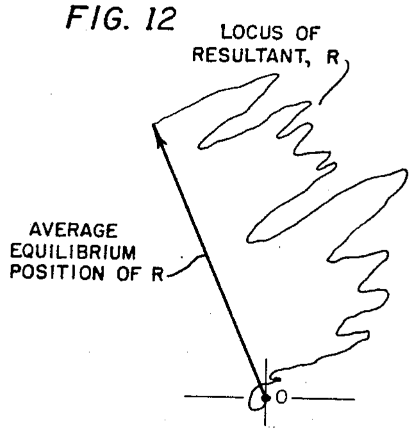
Figure 13:
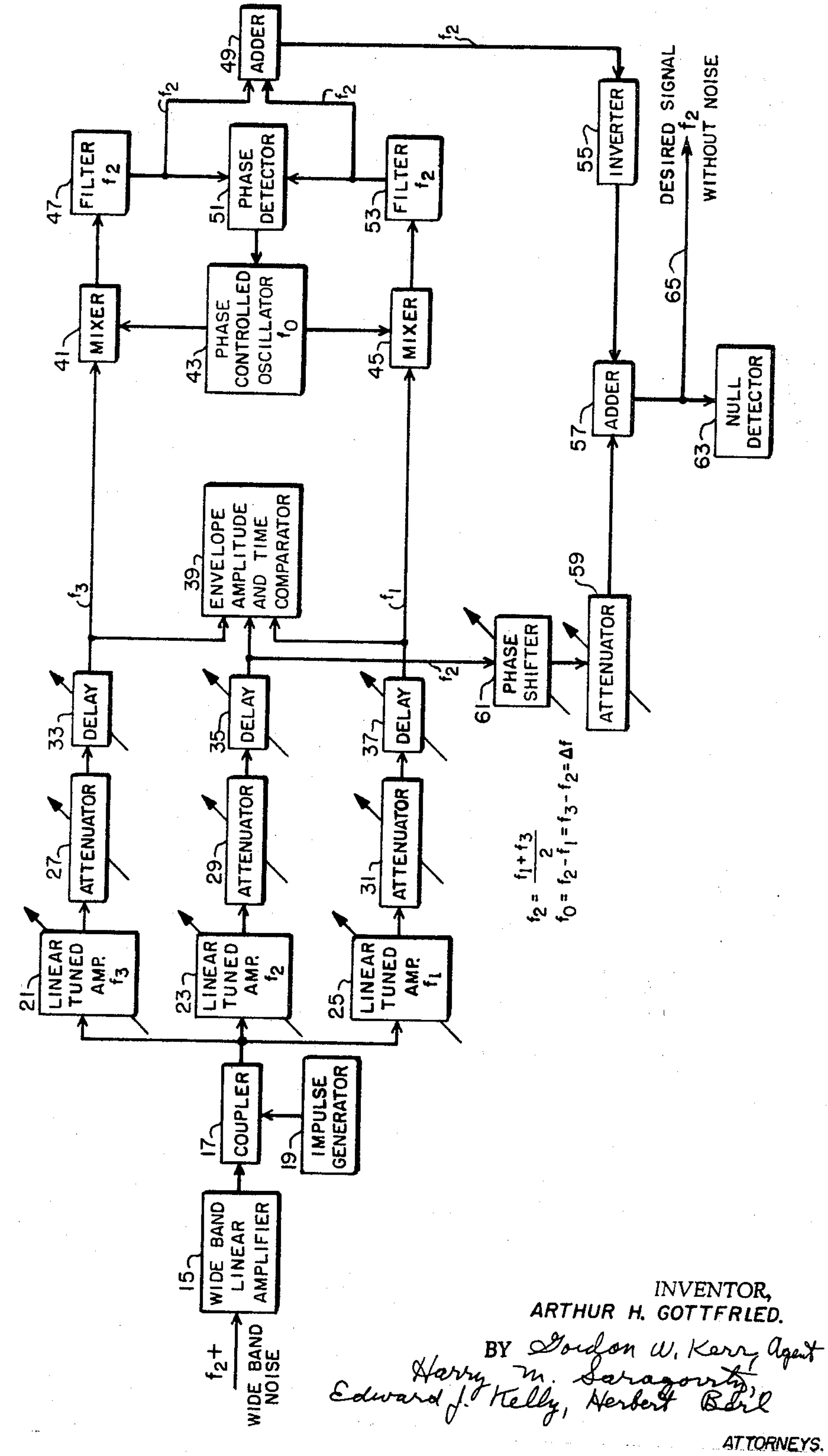

These and other objects and advantages of the invention will become apparent from the following detailed description and drawings in which:

FIGURES 1 through 12 are diagrams useful in understanding the principles of operation of the present invention and FIGURE 13 is an illusrative block diagram of circuitry embodying these principles.

Figure 2:
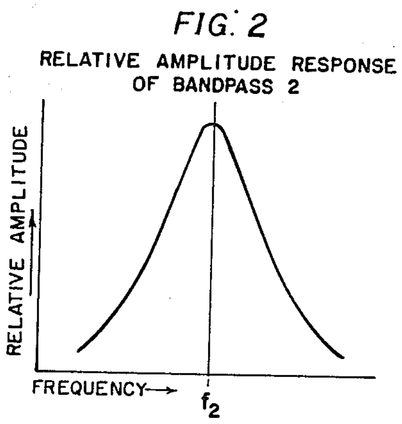
Figure 3:
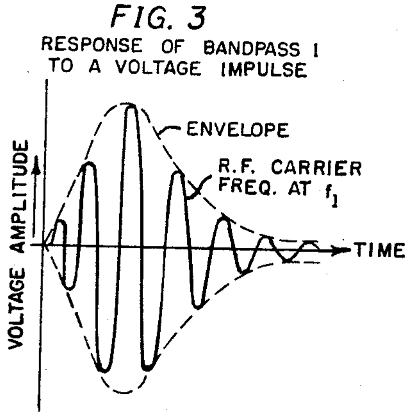
Figure 4:
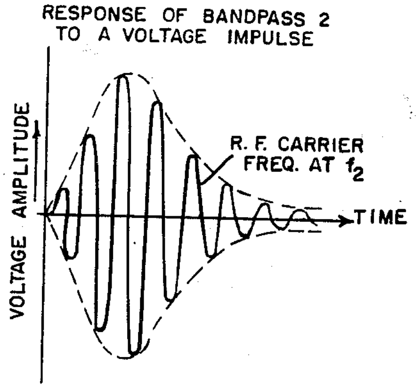

To describe the concept of the present invention, first consider the response of each of two bandpass networks to an ideal voltage impulse. An ideal voltage impulse (a delta function) is a pulse which in the limit is of infinite voltage amplitude and zero time duration, but which has finite volt-time area. A pulse may be considered a delta function if it is short in duration compared to the period of the center frequency of the bandpass, e.g., approximately less than one quarter of the period. Bandpass 1 (herein called BP1) has a center frequency $f_1$; bandpass 2 (herein called BP2) has a center frequency $f_2$, which is higher than $f_1$. The selectivities of these bandpasses are shown in FIGURES 1 and 2. Although $f_1$ does not equal $f_2$, the selectivity and phase characteristics of BP1, plotted as functions of difference frequency from the center frequency, are identical to those of BP2. If the gain of BP1 is equal to that of BP2 at the respective center frequencies, the envelope of the response of BP1 to a single ideal impulse is identical to that of BP2 to the same impulse. (It is assumed that each center frequency is high compared to bandwidth, so that a distinct envelope of the response exists.) Although the envelopes of the responses are identical, the response of BP1 is a damped oscillation of frequency $f_1$, while that of BP2 is a damped oscillation of frequency $f_2$. The response of BP1 is shown in FIGURE 3, and that of BP2 in FIGURE 4. (If the bandpasses do not have arithmetic symmetry about the center frequencies, frequency modulation will also exist on the carrier frequencies $f_1$ and $f_2$. However, this frequency modulation does not alter the present discussion.) The number of cycles of carrier frequency, under the envelope of the response of each bandpass, is of the order of the Q of the bandpass. The carriers of the damped transients start at the same phase with respect to the start of the envelopes.

Consider the effect on the phase of a sinusoidal radio frequency signal when it is heterodyned up or down in frequency by means of a local oscillator. The heterodyning action can best be described mathematically by means of the product of two sinusoids. Thus, if $f_3$ is the frequency being heterodyned, and $f_0$ is the frequency of the local oscillator, the following trigonometric identity is obtained:

$$\cos(\omega_3 t+\phi_3)\cos(\omega_0 t+\phi_0)=\frac{1}{2}\{\cos[(\omega_3-\omega_0)t+(\phi_3-\phi_0)]+\cos[(\omega_3+\omega_0)t+(\phi_3+\phi_0)]\} \quad (1)$$

where:

$\omega_3$=signal radian frequency=$2\pi f_3$
$\omega_0$=local oscillator radian frequency=$2\pi f_0$
$\phi_3$=initial phase of signal frequency
$\phi_0$=initial phase of local oscillator frequency
$t$=time.

From Eq. 1 it can be seen that the difference frequency $(f_3-f_0)$, has a phase less than the original signal phase, and the sum frequency $(f_3+f_0)$, has a phase greater than the original signal phase by an amount equal to the initial local oscillator phase $\phi_0$. Furthermore, if the initial oscillator phase is increased by $\Delta\phi_0$, the difference frequency phase is decreased by $\Delta\phi_0$ while the sum frequency phase is increased by $\Delta\phi_0$. This latter statement is also true for the case of a damped carrier under the envelope of the impulse response of a bandpass, the carrier shifting in phase while the envelope starting time remains stationary. If the frequency $f_3$ being heterodyned consists of the sum of two sinusoids at $f_3$, with initial phases $\phi_3$ and $\phi_3'$, the relative difference between the phases at the original frequency $f_3$ is equal to $\phi_3'-\phi_3$. The relative phase of the components at the difference frequency $f_3-f_0$ is:

$$(\phi_3'-\phi_0)-(\phi_3-\phi_0)=\phi_3 \quad (2)$$

and that at the sum frequency $f_3+f_0$ is:

$$(\phi_3'+\phi_0)-(\phi_3+\phi_0)=\phi_3'-\phi_3 \quad (3)$$

Thus, the relative phases of the components at the original frequency are maintained at the difference and sum frequencies.

Next consider the responses of BP1 (FIGURE 1) to two successive voltage impulses, and the responses of BP2 (FIGURE 2) to the same two impulses. Assume the successive impulses are spaced closely enough in time so that the responses overlap. Then if $\tau$ is the time between impulses, the phase between the two carriers of the impulse responses in BP1 is $\omega_1\tau$, since each response starts at the same phase with respect to its envelope, and the number of radians between the starts of the responses is $\omega_1\tau$. The phase between the two carriers of the responses in BP2 is $\omega_2\tau$. If the responses at frequency $f_1$ are heterodyned up to frequency $f_2$ by means of a local oscillator, the phase between the responses is preserved and maintained equal to $\omega_1\tau$, as indicated in the previous paragraph. Therefore, the responses of BP1, which have been heterodyned up to frequency $f_2$, have a phase difference $\omega_1\tau$, which is different from the phase difference $\omega_2\tau$ of the responses of BP2. The envelope of the combination of heterodyned signals is not the same as that of the unheterodyned signals. This same conclusion holds true whether the signals are heterodyned up or down to another frequency.

Figure 5:
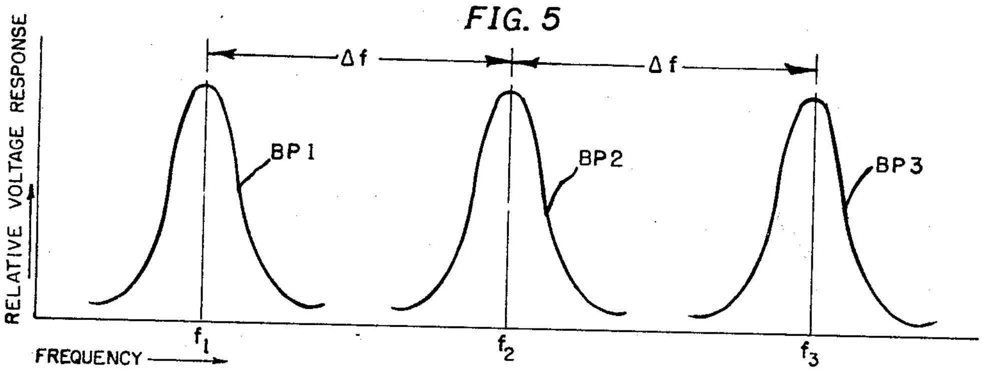

Let us examine next three adjacent channels with the same bandpass amplitude selectivities and phase characteristics about the respective center frequencies and the same gains at the center frequencies. The amplitude selectivities of the three chanels are shown in FIGURE 5. In the figure, the bandpasses are centered at frequencies $f_1$, $f_2$ and $f_3$, and hereafter will be called BP1, and BP3, respectively. The following relations hold:

$$f_3-f_2=\Delta f \qquad \Delta\omega=2\pi\Delta f$$
$$f_2-f_1=\Delta f \qquad \omega_1=2\pi f_1$$
$$\omega_2=2\pi f_2$$
$$f_2=\frac{f_1+f_3}{2} \qquad \omega_3=2\pi f_3 \quad (4)$$

If a series of impulses of random time spacing and random intensity (volt-seconds area) are applied to the three bandpasses simultaneously, the resultant responses $R_1$, $R_2$ and $R_3$ of BP1, BP2 and BP3, respectively are as follows:

Bandpass 1.—Center frequency $f_1=f_2-\Delta f$ $$R_1=h(t-\tau_1)A_1g(t-\tau_1)\cos[(\omega_2-\Delta\omega)t-(\omega_2-\Delta\omega)\tau_1+\alpha]+h(t-\tau_2)A_2g(t-\tau_2)\cos[(\omega_2-\Delta\omega)t-(\omega_2-\Delta\omega)\tau_2+\alpha]+\cdots+h(t-\tau_n)A_ng(t-\tau_n)\cos[(\omega_2-\Delta\omega)t-(\omega_2-\Delta\omega)\tau_n+\alpha] \quad (5)$$

Bandpass 2.—Center frequency $f_2$ $$R_2=h(t-\tau_1)A_1g(t-\tau_1)\cos(\omega_2 t-\omega_2\tau_1+\alpha)+h(t-\tau_2)A_2g(t-\tau_2)\cos(\omega_2 t-\omega_2\tau_2+\alpha)+\cdots+h(t-\tau_n)A_ng(t-\tau_n)\cos(\omega_2 t-\omega_2\tau_n+\alpha) \quad (6)$$

Bandpass 3.—Center frequency $f_3=f_2+\Delta f$ $$R_3=h(t-\tau_1)A_1g(t-\tau_1)\cos[(\omega_2+\Delta\omega)t-(\omega_2+\Delta\omega)\tau_1+\alpha]+h(t-\tau_2)A_2g(t-\tau_2)\cos[(\omega_2+\Delta\omega)t-(\omega_2+\Delta\omega)\tau_2+\alpha]+\cdots+h(t-\tau_n)A_ng(t-\tau_n)\cos[(\omega_2+\Delta\omega)t-(\omega_2+\Delta\omega)\tau_n+\alpha] \quad (7)$$

In Eqs. 5, 6 and 7:

$\alpha$=constant initial phase of the carrier of the $n$th transient at time $\tau_n$, which is the starting time of the carrier. Actually, $\alpha$ is a function of time, but becomes constant in a few cycles of the carrier when the Q of the bandpass is high. The envelope function is very small and is building up when $\alpha$ is varying, and the number of cycles of carrier to the peak of the envelope is of the order of $Q/2$. Hence, when the envelope function is large enough to affect the resultant, $\alpha$ can be considered constant,
$A_n$=is proportional to intensity of $n$th applied impulse,
$\tau_n$=time of occurrence of $n$th applied impulse,
$g(t)$=envelope of unit impulse response as a function of time,
$g(t-\tau_n)$=envelope of delayed unit impulse response to impulse occurring at time $\tau_n$,
$h(t-\tau_n)$=a unit step function,
$h(t-\tau_n)=0$ when $t<\tau_n$,
$=1$ when $t>\tau_n$.

The step functions insure that the successive transient responses start at the times that the initiating impulses start. Now, utilizing a local oscillator of frequency $\Delta f$ and phase $\phi_0$, heterodyne $R_1$ of Eq. 5 up in frequency to $f_2$, and $R_3$ of Eq. 7 down to frequency $f_2$. The oscillator voltage can be represented by the equation $$E_0=A_0\cos(\Delta\omega t+\phi_0) \quad (8)$$

Mathematically, this heterodyning is accomplished by multiplying $R_1$ by $E_0$ and taking the sum frequency, and by multiplying $R_3$ by $E_0$ and taking the difference frequency. Thus, Eq. 5 becomes:

$$R_1'=h(t-\tau_1)A_1\frac{A_0}{2}g(t-\tau_1)\cos[\omega_2t-(\omega_2-\Delta\omega)\tau_1+\alpha+\phi_0]$$
$$+h(t-\tau_2)A_2\frac{A_0}{2}g(t-\tau_2)\cos[\omega_2t-(\omega_2-\Delta\omega)\tau_2+\alpha+\phi_0]$$
$$+-----------+-----------$$
$$+h(t-\tau_n)A_n\frac{A_0}{2}g(t-\tau_n)\cos[\omega_2t-(\omega_2-\Delta\omega)\tau_2+\alpha+\phi_0] \quad (9)$$

Equation 7 becomes:

$$R_3'=h(t-\tau_1)A_1\frac{A_0}{2}g(t-\tau_1)\cos[\omega_2t-(\omega_2+\Delta\omega)\tau_1+\alpha-\phi_0]$$
$$+h(t-\tau_2)A_2\frac{A_0}{2}g(t-\tau_2)\cos[\omega_2t-(\omega_2+\Delta\omega)\tau_2+\alpha-\phi_0]$$
$$+-----------+-----------$$
$$+h(t-\tau_n)A_n\frac{A_0}{2}g(t-\tau_n)\cos[\omega_2t-(\omega_2+\Delta\omega)\tau_n+\alpha-\phi_0] \quad (10)$$

$R_2$ in Eq. 6, $R_1'$ in Eq. 9, and $R_3'$ in Eq. 10 are similar except that corresponding transients have different phases, and a gain factor, $A_0/2$, appears in $R_1'$ and $R_3'$.

In $R_2$, (Eq. 6), the difference in phase between successive transients at any instant of time is:

$$\omega_2\tau_n-\omega_2\tau_{n-1}=\omega_2(\tau_n-\tau_{n-1}) \quad (11)$$

In $R'_1$, the difference in phase between successive transients at any instant of time is:

$$[(\omega_2-\Delta\omega)\tau_n-\phi_0-\alpha-[\omega_2-\Delta\omega)\tau_{n-1}-\phi_0-\alpha]$$
$$=(\omega_2-\Delta\omega)(\tau_n-\tau_{n-1})$$
$$=\omega_1(\tau_n-\tau_{n=1}) \quad (12)$$

In $R_3'$, the difference in phase between successive transients at any instant of time is:

$$[(\omega_2+\Delta\omega)\tau_n+\phi_0-\alpha]-[(\omega_2+\Delta\omega)\tau_{n-1}+\phi_0-\alpha]$$
$$=(\omega_2+\Delta\omega)(\tau_n-\tau_{n-1})$$
$$=\omega_3(\tau_n-\tau_{n-1}) \quad (13)$$

Note that the difference in phase between corresponding successive transients is proportional to the center frequency of the bandpass in which the transients originated.

Figure 6:
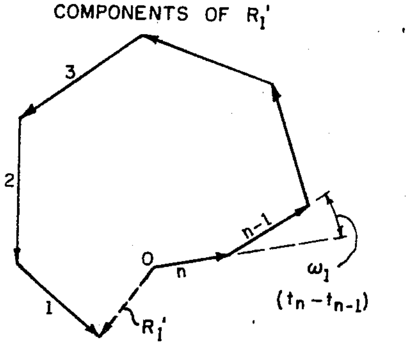
Figure 7:
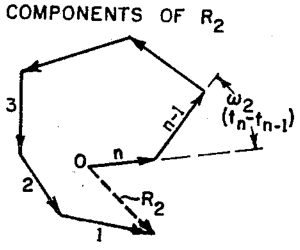
Figure 8:
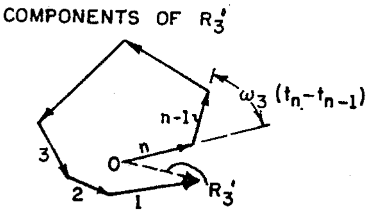

It is convenient to use a vectorial representation of $R_1'$, $R_2$ and $R_3'$. FIGURES 6, 7 and 8 show the components of $R_1'$, $R_2$ and $R_3'$ respectively. For convenience in representation, assume the gain factor $A_0/2=1$. All the vectors rotate counterclockwise at frequency $f_2$. The amplitude of the $n$th vector in each case varies with time as $A_ng(t-\tau_n)$, the $n$th vector starting its build-up in amplitude at $t=\tau_n$.

Assume for the moment that all the $A_n$'s are positive. FIGURES 6, 7 and 8 depict the component vectors, with vector 1 originating at the tip of vector 2, vector 2 at the tip of vector 3, vector $n-1$ at the tip of vector $n$. Vector $n$ starts its build-up latest in time, and vector 1 starts first. The last occurring vector (vector $n$) originates at the origin. The resultant vector is shown dotted. It will be noted that since the angle between successive vectors is proportional to the center frequency of the bandpass in which the transients originate, as indicated by Eqs. 11, 12 and 13, the vector diagram closes on itself more rapidly for higher frequencies.

Figure 10:
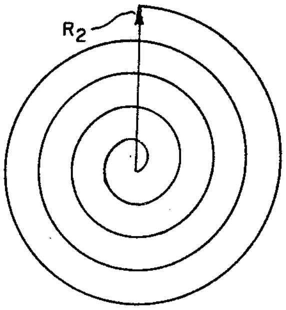
Figure 9:
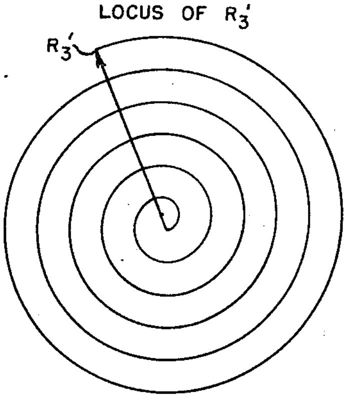

FIGURES 9, 10 and 11 show the loci of $R_1'$, $R_2$ and $R_3'$ when a large number of small component vectors are added. The loci are spirals, the spiral being tighter for higher frequencies. An average equilibrium position (phase) and average magnitude are attained by each resultant, since the magnitudes of the component vectors near the start of the spirals are building up while the magnitudes of the vectors near the end of the spirals are decaying. The fluctuation of the resultant about average equilibrium depends on the random occurrence and magnitudes of the initiating impulses. The time for build-up of the resultant to average equilibrium depends on the time required for build-up of each of the transients, and is of the order of the reciprocal of the bandwidth of the bandpass. The number of rotations in the spiral is of the order of the Q of the bandpass. Since corresponding component vectors for each bandpass are the same length, at any instant of time the total length of the spirals for the three bandpasses is equal.

Consider the phases of the resultants at any instant of time. Since the number of rotations of a spiral is large (of the order of Q), the loci can more or less be approximated by concentric circles. However, the circles will be somewhat distorted and the centers will fluctuate around an average position because of the randomness of the intensity and phase of the initiating impulses. At a given distance along the spiral, the curvature is proportional to the difference in phase between successive transients. Hence, the curvature is proportional to the center frequency of the bandpass, and therefore, the radius of curvature is inversely proportional to frequency. Also, the radius of curvature is proportional to a function of the distance $x$ along a spiral. It is reasonable to assume that this function of $x$ is the same for the three spirals. Thus, $$R=K_1f_1(x)/\omega \quad (14)$$

where:

$R$=radius of curvature,
$\omega$=radian center frequency of the bandpass,
$K_1$=a constant, and
$f_1(x)$=a function of distance along the spiral.

If at a given distance along a spiral, the resultant moves an additional infinitesimal distance, $dx$, the angle swept out by the resultant is:

$$d\theta=\frac{dx}{R}=\frac{\omega dx}{K_1f_1(x)} \quad (15)$$

The total angle swept out by the resultant as it reaches average equilibrium is:

$$\theta=\int_0^L\frac{\omega dx}{K_1f_1(x)} \quad (16)$$
$$\theta=K_2\omega \quad (17)$$

where:

$L$=total length of spiral,
$K_2$=a constant that is a function of $L$.

Since the total length $L$ for each of the three spirals is the same because the respective lengths of the component vectors for BP1, BP2, and BP3 are the same, Eq. 17 states that the total phase angle swept out by the resultant is proportional to the center frequency of the bandpass. The total angle $\theta$ will fluctuate depending on how the total length $L$ fluctuates. In turn, the fluctuation in $L$ depends on the random occurrence and magnitude of the initiating impulses. At any instant of time, however, the angle swept out by the resultant is proportional to the center frequency of the bandpass being considered. Therefore, at any instant, $$\theta=K_2\omega \quad (18)$$
$$\theta_1=K_2\omega_1=K_2(\omega_2-\Delta\omega) \quad (19)$$
$$\theta_2=K_2\omega_2 \quad (20)$$
$$\theta_2=K_2\omega_3=K_2(\omega_2+\Delta\omega) \quad (21)$$

where:

$K_2$=a constant,
$\theta_1$=phase angle of resultant for BP1,
$\theta_2$=phase angle for resultant of BP2,
$\theta_3$=phase angle of resultant for BP3.

To obtain the total phase angle of each resultant, the starting phase angle must be added to the swept out angles expressed by Eqs. 19, 20 and 21. The starting phase angle for each spiral is the phase angle of the $n$th vector component at time equal to $\tau_n$, and is given by the phase angle of the $n$th component in Eqs. 9, 6 and 10. Thus, $$\theta_{1s}=\alpha+\phi_0+\Delta\omega\tau_n \quad (22)$$
$$\theta_{2s}=\alpha \quad (23)$$
$$\theta_{3s}=\alpha-\phi_0-\Delta\omega\tau_n \quad (24)$$

where $\theta_{1s}$, and $\theta_{2s}$ and $\theta_{3s}$ are the starting phase angles for BP1, BP2, and BP3, respectively.

The total phase angles are these respective starting angles added to the respective swept angles given by Eqs. 19, 20 and 21. Thus, $$\theta_{1T}=K_2(\omega_2-\Delta\omega)+(\alpha+\phi_0+\Delta\omega\tau_n) \quad (25)$$
$$\theta_{2T}=K_2\omega_2+\alpha \quad (26)$$
$$\theta_{3T}=K_2(\omega_2+\Delta\omega)+(\alpha-\phi_0-\Delta\omega\tau_n) \quad (27)$$

where $\theta_{1T}$, $\theta_{2T}$ and $\theta_{3T}$ are the total phase angles for BP1, BP2, and BP3, respectively.

The average of Eqs. 25 and 27 is:

$$\frac{\theta_{1T}+\theta_{3T}}{2}=K_2\omega_2+\alpha \quad (28)$$

and so from Eq. 26, $$\frac{\theta_{1T}+\theta_{3T}}{2}=\theta_{2T} \quad (29)$$

Equation 29 states that at any instant the phase angle of the resultant for BP2 is the average of the phase angles of the resultants for BP1 and BP3.

The spiral loci of the resultants in FIGURES 9, 10 and 11 are obtained under the assumption that all of the $A_n$'s ($n=1, 2, 3 \ldots n$) in Eqs. 6, 9 and 10 are positive. If some of the $A_n$'s are negative and some are positive, the spirals open and the loci become zig-zag paths similar to that shown in FIGURE 12.

To determine the total angle swept out by the resultant in FIGURE 12, Eq. 16 can still be used, but the path length is either positive or negative depending on whether the path goes counterclockwise or clockwise, respectively. Let A=total positive path length and B=total negative path length. Then the total positive angle swept out by the resultant is:

$$\theta_+=\int_0^A \frac{\omega}{K_3 f_2(x)}dx \quad (30)$$

where:

$K_3$=a constant,
$f_2(x)$ is a function of distance $x$, common to BP1, BP2 and BP3 (as in Eq. 14).

$$\theta_+K_4\omega \quad (31)$$

where $K_4$ is a constant that is a function of A.

The total negative angle swept out by the resultant is:

$$\theta_-=\int_0^B \frac{\omega}{K_5 f_3(x)}(-dx) \quad (32)$$

where:

$K_5$=a constant, and
$f_3(x)$ is a function of distance $x$, common to BP1, BP2 and BP3 (as in Eq. 12).

$$\theta=K_6\omega \quad (33)$$

where $K_6$=a constant that is a function of B.

The total angle swept out is:

$$\theta=\theta_++\theta_-=(K_4-K_6)\omega$$
$$\theta=K_7\omega \quad (34)$$

A and B, the total instantaneous positive and negative lengths, respectively, for each of the three zig-zag loci for BP1, BP2 and BP3 are the same because the respective lengths of the component vectors for BP1, BP2 and BP3 are the same. Therefore, Eq. 34, which is similar to Eq. 18, states that the total phase angle swept out by the resultant is proportional to frequency. Hence, the same conclusion from Eq. 29 holds true, i.e., at any given instant, the phase angle of the resultant for BP2 is the average of the phase angles of the resultants for BP1 and BP3, regardless of whether the $A_n$'s are positive or negative, or both.

Next consider the magnitudes of the resultants for BP1, BP2 and BP3. The bandpasses are fed by a common noise source with a uniform spectral intensity covering the frequency range of all the bandpasses together. Since the bandwidths of the bandpasses are equal, the root mean square values of the noise in each bandpass are equal. Therefore, the average equilibrium values of the magnitudes of the resultants are equal. Thus, a reasonable value for the instantaneous magnitude of the resultant for BP2 is the instantaneous average of the magnitudes of the resultants for BP1 and BP3.

Recapitulating, at any instant the phase angle and magnitude of the resultant for BP2 equals the average of the phase angles and the average of the magnitudes, respectively, of the resultants for BP1 and BP3. Stated another way, the noise phase of the center channel BP2 is at any instant halfway between the phases of the upper and lower channels.

The noise reduction circuit of FIGURE 13 comprises a wide band linear amplifier 15 to which a desired intelligence signal at frequency $f_2$ plus wideband noise is applied. Amplifier 15 is designed so that all frequencies within its passband pass through a common amplifier and circuits. Thus amplifier 15 may not comprise a plurality of narrowband, stagger-tuned amplifiers. This insures that any noise produced by this amplifier originates from a common source. The output of amplifier 15 is applied via coupler 17 in parallel to the inputs of the three channels comprising the linear tuned amplifiers 21, 23, 25 and the succeeding circuitry in cascade therewith. The impulse generator 19 forms part of the calibration circuitry and when this generator is energized a series of impulses will be applied in parallel to the three channels via the coupler 17. The amplifier 23 of the center channel has a center frequency of $f_2$ equal to that of the desired intelligence signal and the center frequencies $f_3$ and $f_1$ of the upper and lower channel amplifiers 21 and 25, respectively, are above and below the center channel frequency by the same amount. That is, $f_2$ is halfway between $f_1$ and $f_3$. The bandwidth of amplifier 15 is wide enough to encompass the bands of all three of the channels. As stated above, the input amplifier 15 must be free of any intelligence or periodic signals at frequencies in the vicinity of the tuning of the upper and lower channels. The wideband noise at the input of amplifier 15 originates from a common source, for example from the resistance of an antenna which may be connected thereto, or from atmospherics picked up by the antenna. It is necessary for amplifier 15 to be linear so that noise at different frequencies within its passband will not be intermodulated. Also, the gain of amplifier 15 must be large enough so that its noise output is large enough so that any noise introduced by the remainder of the circuitry is negligible compared to the noise originating in or applied to the input of amplifier 15. The three linear tuned amplifiers have identical responses, except for the difference in center frequencies, as illustrated by the curves of FIGURE 5. The outputs of each of the linear tuned amplifiers are applied to variable attenuators 27, 29 and 31 and thence variable delay means 33, 35 and 37. The attenuators may form part of the linear tuned amplifiers. For example, if the amplifiers are equipped with a gain control, no separate attenuators would be necessary. The outputs of the three delay means are applied to the envelope amplitude and time comparator circuit 39. The upper channel further comprises a mixer 41 and the lower channel a similar mixer 45. A phase-controlled oscillator 43 serves as the local oscillator for both the mixers 41 and 45. The nominal frequency $f_0$ of the oscillator is equal to the frequency difference between the tuning of the three channels. Similar bandpass filters 47 and 53 are connected respectively to the outputs of the mixers 41 and 45. The filter 47 selects from the mixer output the difference between the upper channel frequency $f_3$, and the local oscillator frequency $f_0$, the difference frequency being $f_2$, the center channel frequency. The filter 53 of the lower channels selects the sum of the lower channel frequency $f_1$ and the local oscillator frequency, this also being equal to the center channel frequency. Thus both filters are tuned to $f_2$, and have bandwidths equal to those of each of the three linear tuned amplifiers. Thus the noise signals of the upper channel are heterodyned down in frequency to the center channel frequency and the lower channel noise signals heterodyned up thereto. As noted in the previous mathematical discussion, the phases of these heterodyned noise signals will not be the same as the noise originating from the same source in the center channel. The circuitry includes a means for automatically bringing noise signals at the outputs of the filters 47 and 57 into phase with each other. When this occurs the heterodyned noise signals will also be in phase with the noise of the center. The circuitry for accomplishing this comprises the phase detector 51, the inputs of which are the outputs of the filters 47 and 53. The phase detector output varies the phase of the local oscillator by such an amount and in such sense as to bring its two inputs into phase. As noted above, in the absence of the phase control loop, the instantaneous noise signal phase of the center channel will be halfway between the resultant phase of the heterodyned noise signals of the upper and lower channels. A change in phase of the local oscillator affects the phases of the two heterodyned noise signals by the same amount, but in opposite sense, thus the phases are brought into coincidence with each other and with the noise of the center channel. The phase detector is arranged so that its output is zero when its inputs are in phase, thus the local oscillator phase will change until this condition occurs.

The outputs of filters 47 and 53 are summed in the adder 49, the output of which is phase inverted by inverter 55. The desired signal plus noise of the center channel is fed to one input of adder 57 via variable phase shifter 61 and attenuator 59, the other input of adder 57 being the output of the inverter. Since the noise signal inputs of adder 57 are out of phase due to the phase inversion of 55, the adder noise output will be zero if the noise amplitude inputs are equal. The attenuator 59 is a means for equalizing these noise amplitudes during calibration and the achievement of noise cancellation can be observed on null indicator 63. It should be noted that the process of inversion by 55 and addition by the adder 57 amounts to a subtraction of the heterodyned noise signals of the upper and lower channels from those of the center channel. The cancellation or subtraction could alternatively be accomplishing by applying the output of adder 49 and the output of attenuator 59 to a bucking circuit, for example a transformer wherein the heterodyned noise signals and the center channel signals are applied to differently poled windings.

In the calibration of the circuitry of FIGURE 13, the wide band amplifier 15 is disabled and the impulse generator 19 energized. The repetition rate of the impulses from 19 is made low enough so that there is no overlapping of the impulses in any of the succeeding circuitry, that is, the repetition rate is low enough so that the damped transients produced by each impulse in all of the channels die out before the next impulse is generated. The envelope detector and time comparator 39 comprises a means to rectify or detect the damped transients generated by the impulses in the tuned circuits of three tuned amplifiers and to display the envelopes thereof. The circuitry of 39 may comprise three rectifiers connected to the three inputs thereof, with the rectified signals from each of the three channels being applied to a different beam of a triple-beam oscilloscope. The attenuators 27, 29 and 31 are then adjusted so that the gains of the three channels, as indicated by the envelope amplitudes on comparator 39, are equal, and the variable time delay circuits are adjusted so that the envelopes of the three channels are coincident in time, as indicated by the lining up of the three detected envelopes on the triple-beam oscilloscope. The phase shifter 61 and attenuator 59 of the center channel are then adjusted until a null is indicated by detector 63. The attenuator 59 attenuates the center channel noise by an amount equal to the attenuation suffered by noise signals of the other two channels in the heterodyning process, in the adder 49 and inverter 55. Similarly, the phase shifter compensates for the phase shift suffered by the noise signals of the other two channels. When so adjusted, the impulse generator is deenergized and the wide band amplifier is reconnected to the circuit. Thereafter the circuitry will substantially reduce or cancel thermal, shot, impulse or random noise. The desired signal at $f_2$ of course will not be cancelled and will appear at 65, the output of the adder 57, and it may then further be processed by conventional circuitry. It should be noted that random noise is merely a series of impulses with random time spacing, and thus some of these impulses will be spaced close enough together to produce overlapping responses in the tuned circuits of the three channels. As explained above, these overlapping responses vectorially combine to form resultant noise signals in each channel with predictable phase relationships, and the circuitry includes means to utilize these phase relationships to cancel the center channel noise. Thus, while the circuit is calibrated using nonoverlapping impulses, the circuit will cancel or substantially reduce the center channel noise caused by overlapping impulses. The nonoverlapping impulses produce similarly shaped envelope responses in the tuned circuits and the adjustments are more easily made with such similar waveforms. In operation, the phase detector 51 continually adjusts the phase of the oscillator 43 so that the heterodyned noise signals of the upper and lower channels have the proper phase relationship with the center channel noise to effect cancellation thereof.

It should be noted that some of the circuitry of FIGURE 13 is not essential to the practice of the invention, but may be desirable to improve the performance thereof. For example, if the gains and phase shift characteristics of the three linear tuned amplifiers 21, 23 and 25 are all constant and equal, the attenuators 27, 29 and 31, the delay circuits 33, 35, 37 and comparator circuit 39 would be unnecessary, however in many cases it would be more practical to use linear amplifiers with approximately the desired characteristics and compensate for the differences therein by means of the illustrated circuitry. Also, since the phases of the outputs of the filters 47 and 53 are the same it is not essential that these noise outputs be added together before the cancellation takes place in adder 57. Either one of the outputs of filters 47 or 53 could be inverted and applied to adder 57 to accomplish the desired result. However, with the illustrated circuitry the amplitude of the heterodyned noise signals applied to the cancellation circuitry is greater than the output of either of the filters 47 or 55 singly. Thus, less attenuation will be required at 59 to achieve cancellation, and the desired signal at 65 will be at a higher level. Also, the outputs of the filters 47 and 53 may fluctuate in different directions and by taking the sum thereof, these fluctuations will be smoothed out.

Other modifications of the illustrated circuitry will be apparent to those skilled in the art, without departing from the novel concepts disclosed herein.

What is claimed is:

1. A noise cancellation circuit comprising, a wide band linear amplifier; means to split the output of said wide band linear amplifier into a lower, a center and an upper channel, each of said channels comprising linear tuned amplifiers with equal gains, bandwidths and phase characteristics relative to their center frequencies, the tuning of said center channel being halfway between the tuning of said upper and lower channels, the tuning of said wide band amplifier being at least as wide as all three of said channels combined, said center channel containing a desired periodic intelligence signal and all three channels containing noise of common origin, heterodyne means to heterodyne the noise of said upper channel down to the frequency of said center channel and to heterodyne the noise of said lower channel to the frequency of said center channel, further means to bring the phase of the heterodyned noise signals into phase with each other and with the noise of the center channel, and means to subtract said heterodyned and phased noise signals from the output of said center channel, whereby the output of said circuit comprises only said desired intelligence signal.

2. The circuit of claim 1 further including calibration circuitry comprising an impulse generator connected to the input of all three of said channels, a variable phase shifter and a variable attenuator in cascade between the output of said linear tuned amplifier of said center channel and the said output of said center channel.

3. The apparatus of claim 1 wherein said heterodyne means comprises a pair of mixers in said upper and lower channels and a single phase-controlled local oscillator with its output connected to both of said mixers, the nominal frequency of said local oscillator being equal to the frequency difference of said center channel and either of said upper or lower channels, bandpass filters having the same center frequency and bandwith as said center channel connected to the output of each of said mixers, a phase detector with its output connected to the phase control input of said local oscillator and with each of its inputs connected to the output of a different one of said mixers.

4. Apparatus for the reduction of noise by cancellation of noise by cancellation techniques, comprising: means to apply an intelligence signal plus wideband noise of common origin to three parallel tuned circuits, one of said circuits being tuned to the frequency of said intelligence signal and the other two tuned circuits being tuned above and below said intelligence signals by the same amount, means to heterodyne the noise signals passed by said other two tuned circuits to the frequency of said intelligence signal by means of a single local oscillator, means to bring said heterodyned noise signals into phase with each other and with the noise in said one of said circuits, and means to cancel said noise passed by said one of said circuits by subtracting said heterodyned and phased noise signals therefrom.

5. A noise reduction circuit comprising, a wide band linear amplifier, the input of which is an intelligence signal centered at frequency $f_2$, means to couple the output of said wide band amplifier to the inputs of three paralleled linear tuned amplifiers, the first of which is tuned to a frequency $f_1$, the second to frequency $f_2$, and the third to frequency $f_3$, $f_2$ being halfway between $f_1$ and $f_3$, said wide band amplifier having a bandwidth spanning the combined bandwidths of all three of said linear tuned amplifiers, means to couple the output of said first linear tuned amplifier to a first mixer and the output of said third linear tuned amplifier to a second mixer, a phase-controlled local oscillator having its output connected to both of said mixers, a tuned circuit having a center frequency of $f_2$ connected to the output of each of said mixers, a phase detector having its output connected to the phase control input of said local oscillator, the outputs of said mixers being connected to the inputs of said phase detector, a first added having as inputs the outputs of said tuned circuits, the output of said first adder being connected to the input of an inverter, the output of said second linear tuned amplifier being coupled to a variable phase shifter and a variable attenuator in cascade; a second added, the inputs of which are the output of said variable attenuator and the output of said inverter, the output of said second added being said intelligence signal at $f_2$.

6. The circuit of claim 5 wherein both said first and second linear tuned amplifiers are coupled to said mixers via variable attenuators and variable delay circuits in cascade, and wherein said second tuned liner amplifier is coupled to said variable phase shifter via an attenuator and delay circuit in cascade, and further including an envelope amplitude and time comparator having the outputs of all three of said delay circuits connected thereto.

References Cited

UNITED STATES PATENTS 3,311,833 3/1967 Lewis et al. -------- 325—476 X

ROY LAKE, *Primary Examiner.*

J. B. MULLINS, *Assistant Examiner.*

U.S. Cl. X.R.

330—149; 325—476

UNITED STATES PATENT OFFICE

CERTIFICATE OF CORRECTION

Patent No. 3,432,765 March 11, 1969

Arthur H. Gottfried

It is certified that error appears in the above identified patent and that said Letters Patent are hereby corrected as shown below:

Column 4, line 3, after "BP1" insert -- BP2 --. Column 6, line 69, "$\theta_2$" should read -- $\theta_3$ --. Column 7, line 66, "$\theta$" should read -- $\theta_-$ --. Column 12, lines 22, 27 and 29, "added", each occurrence, should read -- adder --; line 34, "liner" should read -- linear --.

Signed and sealed this 21st day of April 1970.

(SEAL)
Attest:

Edward M. Fletcher, Jr.
Attesting Officer

WILLIAM E. SCHUYLER, JR.
Commissioner of Patents